United States Patent [19]

Kiwalle

[11] 3,737,157
[45] June 5, 1973

[54] CLAMPING DEVICE
[75] Inventor: Josef Kiwalle, Peoria, Ill.
[73] Assignee: Production Technology Inc., Peoria, Ill.
[22] Filed: Apr. 21, 1971
[21] Appl. No.: 136,129

[52] U.S. Cl. .................269/31, 269/34, 269/218, 269/239
[51] Int. Cl. ....................B25b 1/04, B25b 1/18
[58] Field of Search................269/25, 31, 34, 157, 269/218, 237, 239

[56] References Cited
UNITED STATES PATENTS
2,692,059  10/1954  Bolling, Jr. .................269/218 X
3,386,726  6/1968  Lorenz .................269/218 X Primary Examiner—Granville Y. Custer, Jr.
Assistant Examiner—Neil Abrams
Attorney—Fryer, Tjensvold, Feix, Phillips & Lempio

[57] ABSTRACT

A clamping device holds a workpiece against rotary motion while a welding operation is performed on the workpiece. The clamping force is exerted on the workpiece by a pair of opposed pivotally supported clamping arms activated by a single fluid cylinder which has the piston rod of the cylinder attached to one of the clamping arms. the other clamping arm is moved by a drive connection between the two arms.

2 Claims, 6 Drawing Figures

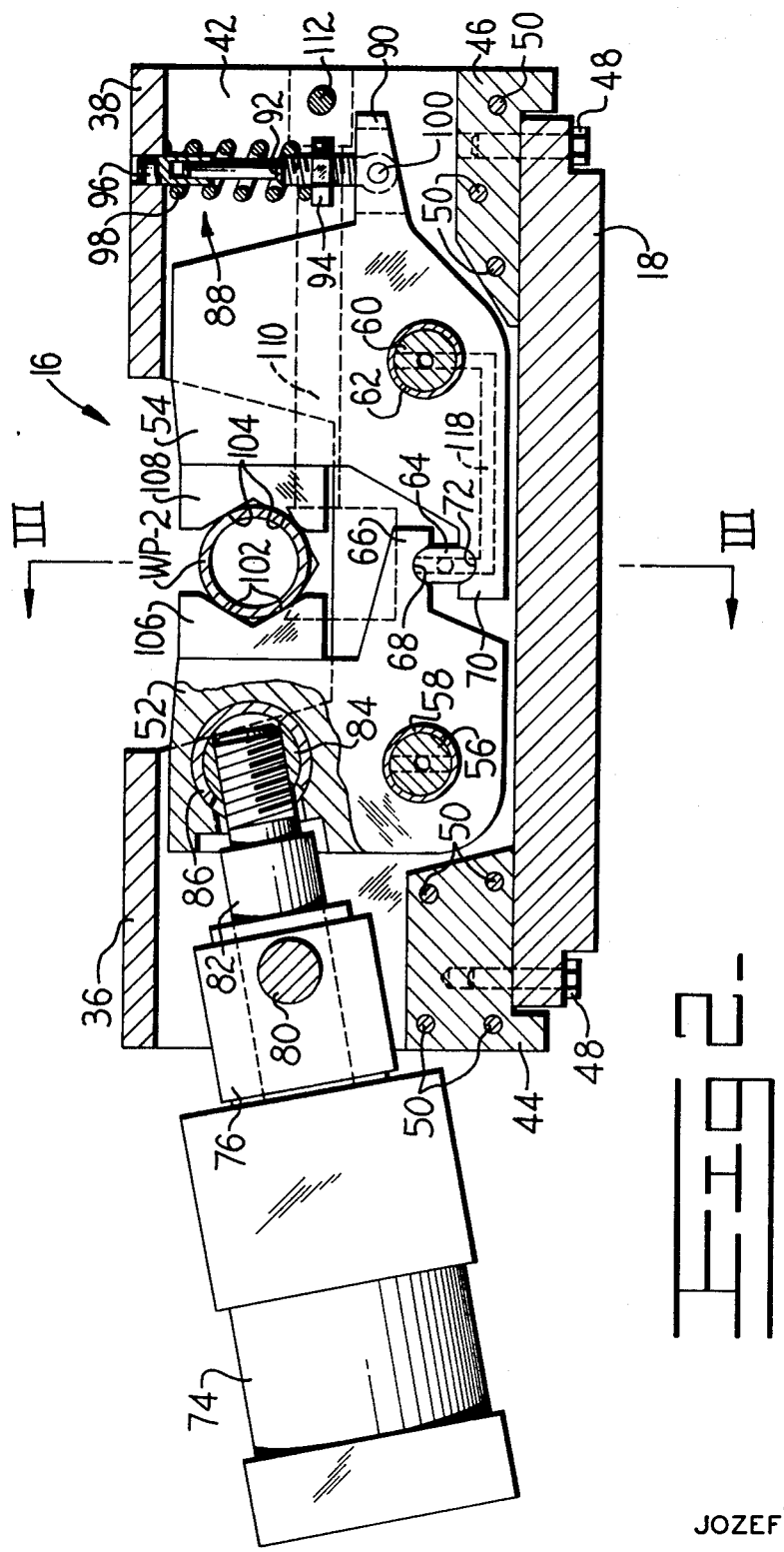

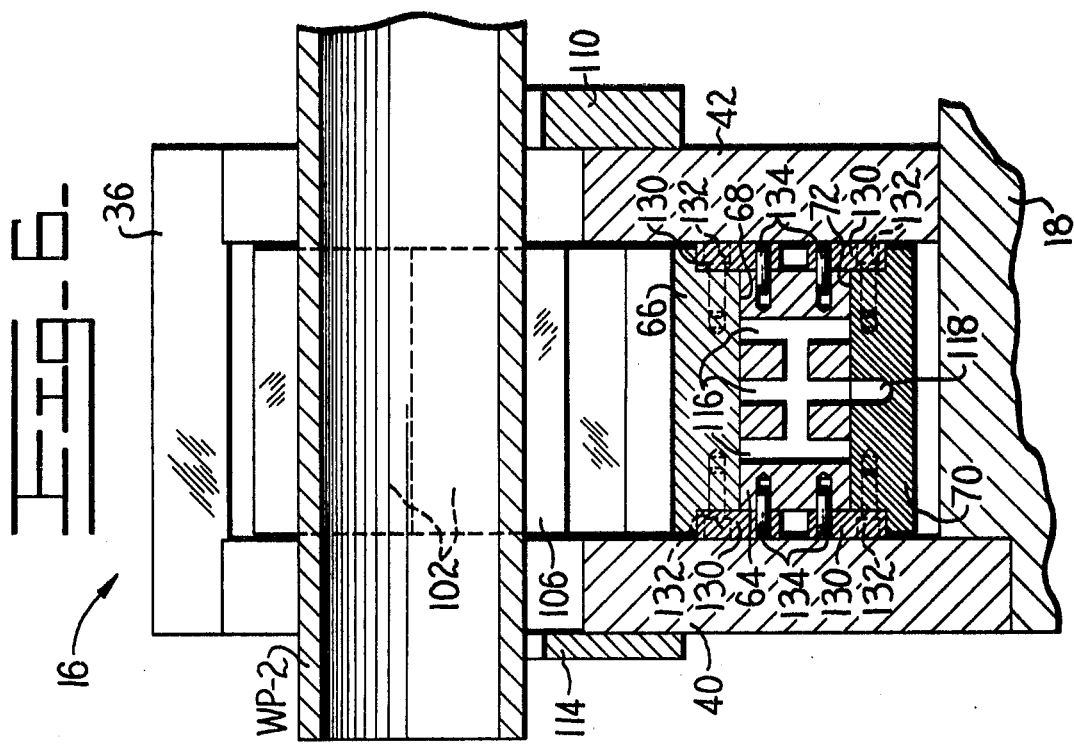
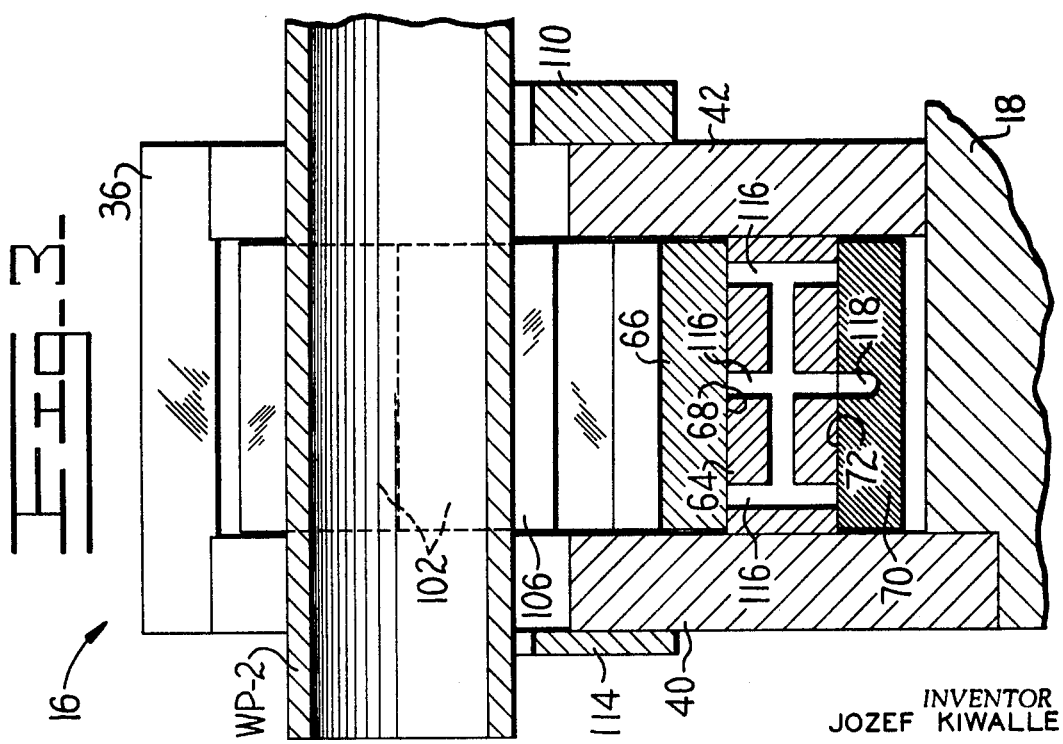

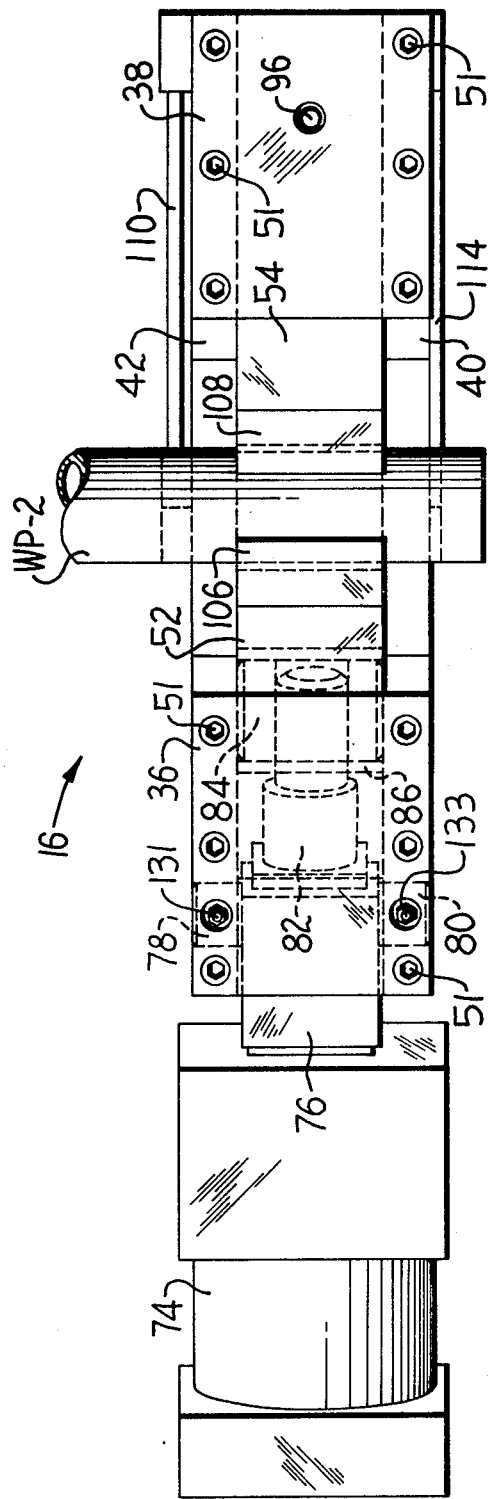

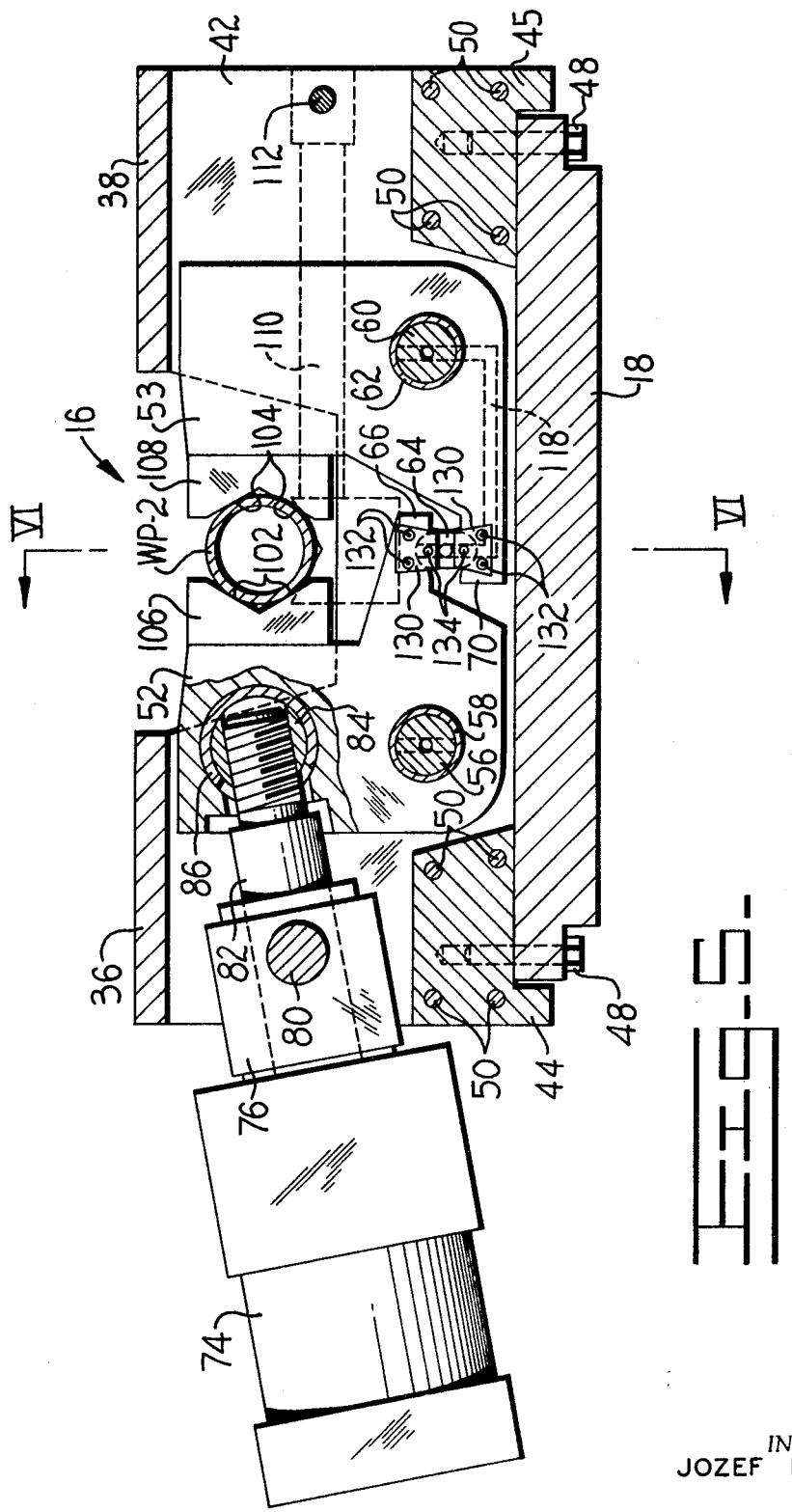

CLAMPING DEVICE

BACKGROUND OF THE INVENTION

The present invention relates to a clamping device and in particular to a clamping device for securely holding a workpiece in the tailstock portion of a friction or inertia welding machine. Clamping of a non-rotatable workpiece is accomplished by a pair of clamping arms pivotally mounted within a fixture and powered by a fluid cylinder. A connecting member in driving engagement with the two clamping arms forces the arms to move in unison and in opposed directions.

A multitude of holding and clamping fixtures have been designed for holding and clamping a non-rotatable workpiece in a machine while a work operation is performed on the workpiece. However, most of these clamping fixtures are unduly complicated and in many cases unsatisfactory for securely holding a non-rotatable workpiece in a friction or inertia welding machine. This is due to the unusually high torque forces developed during the welding operation which will cause the workpiece to slip or turn circumferentially unless the workpiece is firmly held by the clamping fixture. Due to this problem, various types of holding fixtures have been specifically designed for clamping the non-rotatable workpiece in a friction or inertia welding machine. Many of these holding fixtures have proved to be unsatisfactory due to various reasons. Some of these reasons include: large bulky fixtures due to the use of two fluid cylinders for activating the fixtures; complicated and expensive fixtures due to a large number of moving parts within the fixtures; and increased cycle time of the welding machine due to the slow workings of the clamping fixture.

SUMMARY AND OBJECTS OF THE INVENTION

The fixture of the present invention forms a portion of the tailstock of an inertia welding machine to securely hold and automatically center a non-rotatable workpiece for joining to a rotatable workpiece. The non-rotatable workpiece is clamped between two self-centering clamping arms which are pivotally mounted within a fixture structure. The clamping arms are powered by a single fluid cylinder. To accomplish this the cylinder is directly connected to a single one of the pair of clamping arms. A driving connection is provided between the two clamping arms so that power actuation of the one arm results in simultaneous opposed movement of the other arm. This provides a self-centering clamping device which is capable of exerting great force for positively restraining the workpiece from rotary motion during the welding operation.

Accordingly, it is an object of the present invention to overcome the above briefly-described problems in clamping devices for friction or inertia welding machines with a fixture structure which is simple and inexpensive to construct and which provides a greater clamping force in operation.

It is also an object of the subject invention to construct a clamping device embodying a single fluid powered cylinder for operating two pivotally supported clamping arms.

It is another object to connect only one of the clamping arms to the fluid cylinder and drivingly interconnect the two clamping arms to provide simultaneous movement of both arms in opposed directions.

It is a still further object to interconnect the two clamping arms while still allowing each arm to pivot on an individual pivot point for self-centering of the workpiece.

BRIEF DESCRIPTION OF THE DRAWINGS

Other objects of this invention will become apparent from the following description and accompanying drawings wherein:

FIG. 2 is a partially sectioned, side elevation view of a clamping device of the present invention.

FIG. 3 is a sectional view of the clamping device taken in the direction of arrows III—III in FIG. 2.

FIG. 4 is a plan view of the clamping device shown in FIG. 2.

FIG. 5 is a side view partially in section of another embodiment of the clamping device, and FIG. 6 is a sectioned view taken in the direction of arrows VI—VI in FIG. 5.

DESCRIPTION OF THE PREFERRED EMBODIMENT

Figure 1:
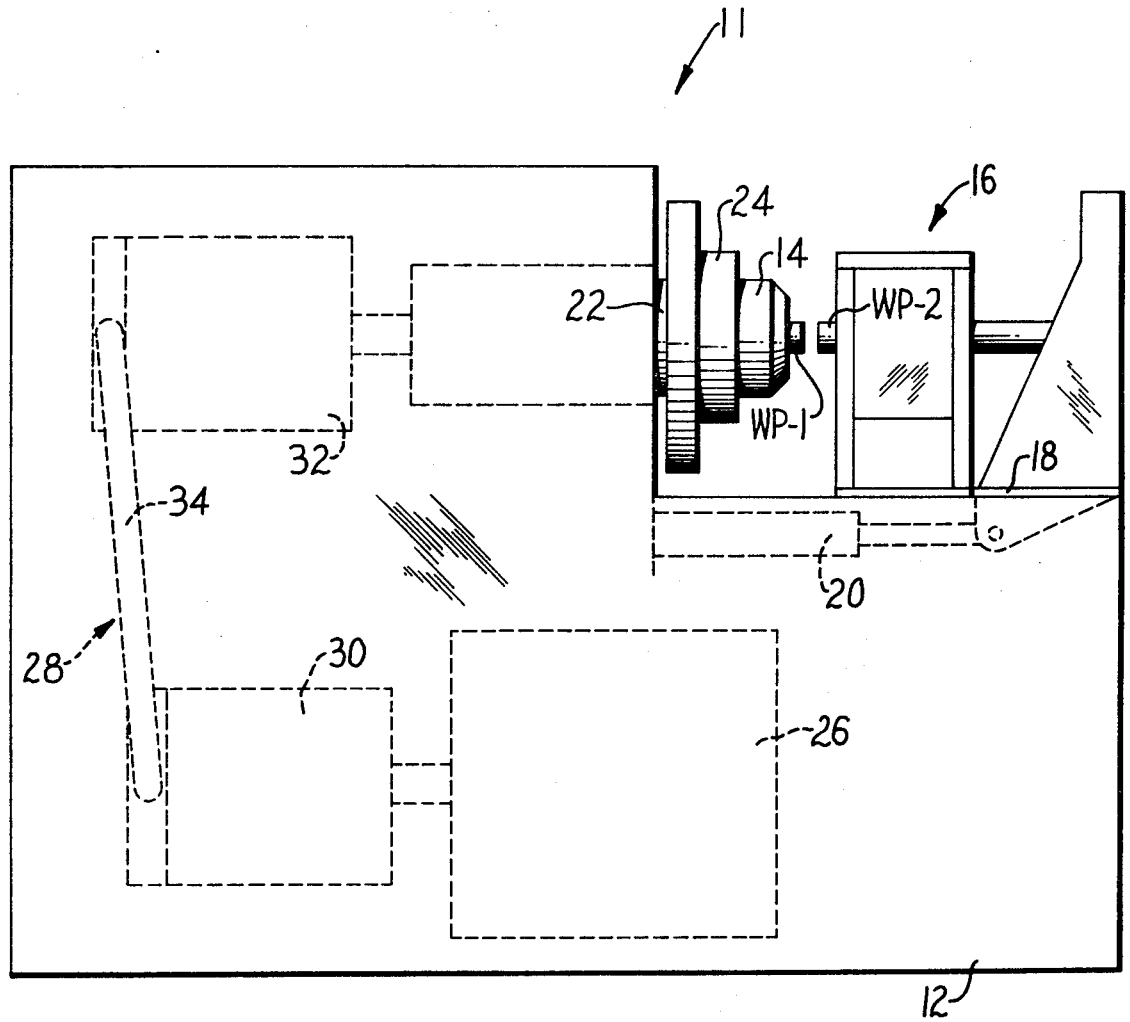
FIG. 1 is a side view, in diagrammatic form, of an inertia welding machine, including the subject clamping device.

A friction welding machine is illustrated in FIG. 1 as an examplary setting for the clamping device according to the present invention. The welding machine, generally denoted by the reference numeral 11, comprises a frame or housing structure 12 for housing the various elements of the machine. The two parts to be welded, workpieces WP1 and WP2 are mounted respectively within the rotatable chuck 14 and the clamping device 16 of the present invention.

The clamping device 16 does not rotate and is mounted on a tailstock platen 18. The platen 18 is mounted for axial movement on the machine frame 12 under the control of a load cylinder 20. A pressure control circuit, not shown, regulates the pressure in the load cylinder and thus determines the force with which the parts WP1 and WP2 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine. The machine can then be operated as an inertia welding machine as described in U.S. Pat. No. 3,273,233 and as described in further detail below.

An electric motor 26 rotates the spindle through a hydrostatic transmission generally indicated by the reference numeral 28. The hydrostatic transmission 28 includes a hydraulic pump 30, a hydraulic motor 32, and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and pump 30 to a position in which the pump 30 does not displace any hydraulic fluid to the motor 32.

A welding operation to join a first workpiece WP1 to a second workpiece WP2 can be performed by operating the machine in the following general manner.

One workpiece WP1 is firmly clamped in the rotatable chuck 14 located on the spindle 22. The other workpiece WP2 is firmly clamped within the clamping device 16 which is located on the tailstock platen 18 of the welding machine. Upon actuation of the motor 26, the spindle 22, flywheels 24, and workpiece WP1 are accelerated to a predetermined velocity.

Once the predetermined velocity has been obtained, the motor 26 is disconnected or shut down and the ram mechanism 20 is actuated to move the tailstock platen 18 and the clamping device 16 towards the rotating spindle which causes the workpiece WP2 to come into contact with the rapidly rotating workpiece WP1. As the two workpieces are brought into contact under the upsetting pressure applied by ram 20, heat is generated at the contacting surface or interface of the weld pieces. This heating increases until the workpieces reach the welding temperature, at which time the upsetting pressure, applied by the ram 20 at either a constant or varying pressure, causes flashing or upsetting to occur. During this heating and flashing, the rotational velocity of the spindle member 22 has continued to decrease. At the time the rotation of the spindle ceases, upsetting has taken place and the weld is completed. The chuck 14 and clamping device 16 are then released, the ram 20 is deactivated, and the completed weld assembly can be removed from the machine.

The clamping device 16 of the present invention, as best shown in FIG. 2, 3 and 4 comprises two top plates 36 and 38, a front cover plate 40, a rear cover plate 42, and two side blocks 44 and 46. The front and rear cover plates 40 and 42 fasten to the side blocks 44 and 46 by means of a plurality of capscrews 50. The two top plates 36 and 38 fasten to the front and rear cover plates 40 and 42 also by means of capscrews 51. The entire structure fastens to the tailstock platen 18 by means of bolts 48.

Housed within the structure of the clamping device 16 are a pair of clamping arms 52 and 54. Arm 52 is supported for pivotal motion to the front and rear cover plates by a pin 56 and a bushing 58. Likewise, arm 54 is supported for pivotal motion by pin 60 and bushing 62. End portions 66 and 70 of arms 52 and 54, respectively contain cylindrical seats 68 and 72. A driving and timing member 64 engages the cylindrical seats 68 and 72 for providing movement of arm 54 in response to movement of arm 52.

A power actuating means consisting of a fluid cylinder 74 is pivotally supported in the structure of clamping device 16. This support is provided by a cylindrical member 76 rigidly secured to cylinder 74 and which includes outwardly extending pin portions 78 and 80. Pin 80 pivotally engages the front cover plate 40 and pin 78 similarly engages the rear cover plate 42 to provide for pivotal motion of the cylinder 74 within the structure of the clamping device. The hydraulic piston rod 82 of cylinder 74 passes through member 76 and threadably connects to a pin 84 fastened within clamping arm 52. A bushing 86, surrounds the pin 84 and allows for pivotal motion of the pin with respect to the arm 52.

A biasing means or assembly 88 applies a force to a second end portion 90 of arm 54 in order to maintain engagement of the spherical seat 72 with the connecting member 64. The biasing means 88 comprises a threaded eye-bolt 92, a collar nut 94, a guide pin 96 and a spring 98. The eye portion of the eye-bolt 92 is pinned for pivotal motion to the end portion 90 of arm 54 by a pin 100. The opposite end of eye-bolt 92 reciprocates within a counter bore of guide pin 96 as arm 54 pivots about pin 60. The spring 98 is compressed between plate 38 and the collar nut 94 and the force applied by the spring 98 to end portion 90 can be adjusted by threading the collar nut in one direction or the other on the threaded eye-bolt 92.

A workpiece WP2 is held by clamping areas 102 and 104 of clamping arms 52 and 54, respectively. Preferably, the clamping areas 102 and 104 are V-shaped surfaces on replaceable clamping jaws 106 and 108, respectively, which can be bolted to arms 52 and 54. In this manner, various sizes and shapes of jaws 106 and 108 can be provided to accommodate various sizes and materials of workpiece WP2. Although the workpiece WP2 has been illustrated as a tubular member in FIGS. 2 and 3, it is to be understood that the clamping device can be used to hold solid members also. Although the clamping areas 102 and 104 would normally be provided with denticulations, smooth clamping surfaces are also possible due to the extreme force applied to the workpiece WP2 by the subject clamping device. As shown in dotted line detail in FIG. 2, a workpiece supporting assembly 110 is fastened by a pin 112 to the rear cover plate 42. This supporting assembly 110 can support the workpiece WP2 when the clamping arms 52 and 54 are in an unclamped position.

In FIG. 2, the clamping device 16 is shown in a clamped position wherein fluid pressure is communicated to the head end of cylinder 74 to extend rod 82. Extension of rod 82 causes the clamping arms 52 and 54 to pivot in opposite directions about the pins 56 and 60 such that areas 102 and 104 contact the workpiece WP2. Although only arm 52 is connected to the piston rod 82 of cylinder 74, the inter-connection of the two arms 52 and 54 by means of drive member 64 causes arm 54 to move with arm 52 when the cylinder 74 is activated. When the two clamping arms 52 and 54 are pivoted toward each other to clamp the workpiece WP2, the spring 98 is further compressed between the plate 38 and the collar nut 94. In this manner, when the fluid cylinder 74 is deactivated or retracted, arm 54 remains in contact with the member 64 under the influence of the compressed spring 98.

Referring specifically to FIG. 3, there is shown a sectioned view of the clamping assembly 16 as taken along the lines III—III of FIG. 2. As shown in this Figure, a second support arm 114 is fastened to the front cover plate 40 and supports the forward portion of the workpiece WP2 when the jaws of the clamping device are unclamped. This supporting arm 114 is similar to the supporting assembly 110 although smaller in size.

The connecting member 64 is preferably constructed of a low friction material, such as bronze to insure long life and slow wear, and is provided with a plurality of radial lubrication holes 116 which lead from the contact surfaces of the member 64 to a lubrication supply passage 118 in member 54. In this way, lubrication is provided to the cylindrical seats 68 and 72 to reduce friction when relative motion exists between end portions 56 and 70 and the connecting member 64.

The plan view of the clamping device (as shown in FIG. 4) illustrates how the pin members 78 and 80 of the cylindrical member 76 are situated within plates 40 and 42 for supporting the cylinder 74. As previously mentioned, the top plates 36 and 38 are fastened to the front and rear cover plates 40 and 42 by a plurality of capscrews 51. Grease fittings 131 and 133 situated in plate 36 supply lubrication to the pin members 78 and 80 to reduce friction during pivotal motion of the pins within the plates as the cylinder 74 pivots.

FIGS. 5 and 6 illustrate an alternate embodiment of the clamping device 16. In this embodiment, the components which are the same as those shown in FIG. 2 have been identified by the same reference characters.

In this embodiment, the biasing assembly 88 of the previous embodiment is eliminated by provision of alternate timing means. Drive member 64 is modified to accommodate a plurality of brackets 130. Two of these brackets 130 (one on either side) bolt to arms 52 and 53 and are then pinned to the driving member 64. In this manner, the brackets 130 and driving member 64 become a pivotal link between the arms 52 and 53 and maintain engagement of the arms with the connecting member. By this arrangement, clamping arm 53 must follow the movement of clamping arm 52 when the fluid cylinder 74 is activated or deactivated.

Block 45, which is essentially identical to block 44 is also provided and replaces the previous block 46.

Operation of the clamping device 16 is essentially the same in all other respects as previously described.

FIG. 6 illustrates a sectioned view of the clamping device of FIG. 5 taken along lines VI—VI. As previously mentioned, a plurality of capscrews 132 fastens the brackets 130 to arms 52 and 53. Likewise, pins 134 fasten the brackets 130 to the connecting member 64.

Although the present clamping device has been described herein with particular reference to its use on a friction or inertia welding machine, it is to be understood that such a clamping device could be used with other types of machine tools. Also, it is to be understood that changes and modifications may be made in the above-described apparatus without departing from the spirit and scope of the present invention as described in the appended claims.

We claim:

1. A clamping device for non-rotatable support of a workpiece comprising a support fixture, first and second clamping arms pivotally supported in the fixture and including workpiece gripping areas in opposed facing relationship, power actuating means engaging one of the arms for powered pivotal movement thereof, pivotal drive means operatively engaging said clamping arms so that pivotal movement of one of the arms by actuation of the power actuating means causes opposed pivotal motion of the other clamping arm to bring the respective gripping surfaces into opposed gripping relationship with a workpiece disposed therebetween, said pivotal drive means comprising a drive member arranged for pivotal interaction between adjacent end portions of the arms, and means for maintaining engagement of said first and second arms with said drive means, said means for maintaining engagement comprising biasing means arranged for interaction between said second clamping arm and said support fixture.

2. A clamping device for non-rotatable support of a workpiece comprising a support fixture, first and second clamping arms pivotally supported in the fixture and including workpiece gripping areas in opposed facing relationship, power actuating means engaging one of the arms for powered pivotal movement thereof, pivotal drive means operatively engaging said clamping arms so that pivotal movement of one of the arms by actuation of the power actuating means causes opposed pivotal motion of the other clamping arm to bring the respective gripping surfaces into opposed gripping relationship with a workpiece disposed therebetween, and means for maintaining engagement of said first and second arms with said drive means, said means for maintaining engagement comprising a positive connection between said first arm and said pivotal drive means and between said second arm and said pivotal drive means.

* * * * *